United States Patent [19]
Swidler

[11] Patent Number: 6,124,044
[45] Date of Patent: Sep. 26, 2000

[54] POLYMERIC PEEL-OFF COATING COMPOSITIONS AND METHODS OF USE THEREOF

[75] Inventor: Ronald Swidler, Palo Alto, Calif.

[73] Assignee: Cal-West Equipment Company, Inc., Sunnyvale, Calif.

[21] Appl. No.: 08/549,494

[22] Filed: Oct. 27, 1995

[51] Int. Cl.[7] ............................. B05D 33/00; B32B 27/00
[52] U.S. Cl. ........................ 428/500; 427/154; 427/156; 427/388.4; 427/155; 428/461
[58] Field of Search ..................... 427/154–156, 427/385.5, 388.4; 428/461, 500, 409; 524/44, 297, 317, 386, 388

[56] References Cited

U.S. PATENT DOCUMENTS

| | | | |
|---|---|---|---|
| 3,620,796 | 11/1971 | Gordy | 427/154 |
| 3,653,894 | 4/1972 | Levy et al. | 96/7 |
| 3,779,992 | 12/1973 | Liu et al. | |
| 3,895,143 | 7/1975 | Tarlow | 428/40 |
| 4,089,828 | 5/1978 | Vasishth et al. | 427/380 |
| 4,146,511 | 3/1979 | Moriya et al. | 260/3 |
| 4,233,395 | 11/1980 | Klüpfel et al. | 430/271 |
| 4,253,580 | 3/1981 | Doi et al. | 215/228 |
| 4,310,100 | 1/1982 | Kunimoto et al. | 215/228 |
| 4,395,446 | 7/1983 | Kunimoto et al. | 428/35 |
| 4,526,913 | 7/1985 | Winkler et al. | 524/31 |
| 4,636,543 | 1/1987 | Helton | 427/155 |
| 4,642,265 | 2/1987 | Suzuki | 428/375 |
| 4,647,000 | 3/1987 | Osada | 249/83 |
| 4,678,689 | 7/1987 | Phillips | 428/13 |
| 4,748,049 | 5/1988 | Charles et al. | 427/156 |
| 4,856,857 | 8/1989 | Takeuchi et al. | 350/36 |
| 4,978,436 | 12/1990 | Kelly | 204/168 |
| 5,010,131 | 4/1991 | Wagner | 524/457 |
| 5,143,949 | 9/1992 | Grogan et al. | 523/334 |
| 5,169,900 | 12/1992 | Gudelis | 525/106 |
| 5,186,978 | 2/1993 | Woodhall et al. | 427/154 |
| 5,224,967 | 7/1993 | Rolf et al. | 47/58.1 |
| 5,244,677 | 9/1993 | Kreckel et al. | 424/448 |
| 5,281,436 | 1/1994 | Swidler | 427/156 |
| 5,300,558 | 4/1994 | Kurisu et al. | 524/107 |
| 5,330,795 | 7/1994 | Batdorf | 427/136 |
| 5,418,006 | 5/1995 | Roth et al. | 427/154 |
| 5,509,969 | 4/1996 | Grawe | 134/2 |
| 5,548,017 | 8/1996 | DiStefano | 524/514 |
| 5,736,470 | 4/1998 | Schneberger et al. | 442/555 |
| 5,824,734 | 10/1998 | Yang | 524/555 |

OTHER PUBLICATIONS

HYCAR High Performance Emulsions, Technical Data HYCAR 2679, Dec. 1993, BF Goodrich Company.
TI–PURE Grade Description, Ti–Pure R–902, Du Pont (No Date).
Michelman, Inc. Technical Data Sheet, Cincinnati, Ohio, Rev. ML Jan. 8, 1992.
CARBOSET High Performance Polymers for Coatings, Carboset PL958 Technical Data Sheet, BF Goodrich Company No Date.
Morton ADCOTE 50T4983 data sheet, Morton Co. (No Date).
Smith, et al. Industrial & Engineering Chem., 51:1361–1364 (1959) (No Mo.).

*Primary Examiner*—Diana Dudash
*Attorney, Agent, or Firm*—Skjerven, Morrill, MacPherson, Franklin & Friel; Tom Hunter

[57] ABSTRACT

Methods are provided for protecting exterior surfaces of automobiles and other products, or components of products, against abrasion, abrasive dust, water, acid rain, etc. The methods involve applying to a surface a protective coating composition comprising an emulsion selected from the group consisting of a vinyl-acrylic copolymer emulsion and a vinyl acetate-ethylene emulsion. The emulsion is dried to form a water-resistant protective coating that can be removed from the underlying surface by peeling when no longer desired.

19 Claims, 1 Drawing Sheet

POLYMERIC PEEL-OFF COATING COMPOSITIONS AND METHODS OF USE THEREOF

BACKGROUND OF THE INVENTION

The present invention relates to surface protective coatings and more specifically to peel-off (peelable) coatings effective for protecting exposed surfaces of various products and components. In particular, the coatings are suitable for protection of vehicles and vehicle components.

The surface paint finishes of new vehicles are subject to a variety of injuries both during the assembly process and during transportation from the assembly plant to retail locations. These finishes are especially prone to damage in the first month following manufacture because the paint has not had sufficient time to cure. Typical sources of damage include acid rain, bird droppings and "rail dust", a cloud of hard, abrasive particles which rises from a rail bed as a train passes over the rails. Rail dust is an especially difficult problem for car manufacturers as many cars are transported form assembly plants or dockyards to retail markets by rail. The damage inflicted on the vehicles' surface finish during transit can be quite severe, even requiring shipment back to the assembly plant for complete repainting.

In addition to new vehicles, other products are also subjected to abrasive and deleterious conditions during transit, and during fabrication and assembly into other products. For instance, storm windows and other glass products must be specially protected to avoid scratching and marring during road and rail transit. Deck cargo is also susceptible to surface damage caused by salt water and other factors. Similarly, many products must be protected during fabrication or assembly by downstream manufacturers. For example, plastic laminates such as Formica® and other materials with high-gloss finishes such as bathroom fixtures and chrome plated or brass surfaces must be protected not only during shipping, but during installation or assembly into other products.

Various approaches have been utilized to protect the exposed surfaces of vehicles, vehicle components, and other products during manufacture and transportation. The simplest approach, physical protection with solid coatings (e.g., covering the vehicle or component with plastic or canvas) is effective, but it is labor intensive and therefore prohibitively expensive for mass shipments. Plastic sheeting, for example, is as much as ten times more expensive to use than chemical coating solutions due to higher material costs and the amount of labor needed to properly apply the sheetings. In addition it is difficult, time consuming and sometimes virtually impossible to apply solid sheet coatings to complex or convoluted surfaces.

Solution-type protective compositions are known, but have not found widespread use because of the damage which may possibly occur to the underlying or adjacent surfaces. These compositions are often difficult to remove from certain surfaces (e.g. underlying plastics). Also, traditional chemical methods suffer from high cost and the health and environmental dangers posed by solvent-based solutions and coatings.

Aqueous emulsion type coatings are also easily applied and eliminate the problems associated with various organic solvent systems. The most widely used are polyvinyl acetate emulsions or acrylic resin emulsions. These emulsions, however, are defective with respect to heat stability, resistance to water and stability in storage, and low drying velocity after application. For example, those disclosed in Japanese Patent Publication No. 14770/73 which are prepared by adding floury materials such as calcium carbonate and titanium dioxide, silicone resin and an aqueous emulsion of paraffin wax are defective in their poor stability when stored for a long time, and also in their low drying velocity after application. In addition many coatings tend to crosslink, particularly after exposure to sunlight (UV radiation) or elevated temperature, and become very difficult to remove.

SUMMARY OF THE INVENTION

This invention provides for a method of protecting surfaces. The method of this invention includes the steps of applying to the surface a coating composition comprising an emulsion selected from the group consisting of a vinyl-acrylic copolymer and a vinyl acetate ethylene emulsion, and drying the coating composition to form on the surface a substantially continuous film. The film forms a tough, yet flexible coating that may be subsequently removed from the surface by mechanical peeling when the coating is no longer required. By "substantially continuous film" it is intended to mean herein a film generally lacking pinholes through which water, oil, paint, dust, or other materials could reach the underlying surface. In a particularly preferred embodiment, the peel-off coatings of the present invention are used to protect components of automobiles, automobile surface finishes or other articles of manufacture.

In particular, this invention is premised, in part, on the surprising discovery that vinyl-acrylic copolymer emulsions, typically used for interior and exterior paints, and vinyl acetate-ethylene emulsions, typically used as adhesives, may also be used as peelable protective coatings in a wide variety of contexts. Thus, in one embodiment, this invention provides a method of protecting a surface involving applying to the surface a protective coating composition comprising an emulsion selected from the group consisting of a vinyl-acrylic copolymer emulsion and a vinyl acetate-ethylene emulsion. The emulsion is preferably an aqueous emulsion, more preferably Flexbond 325, or Flexbond 380. The coating composition can also include a pigment (e.g. $TiO_2$). The emulsion may be applied by any convenient means including, but not limited to, application by a sprayer, a brush, a roller, and a doctor bar. After application, the composition can be air dried at room temperature.

The method can additionally include removing the protective composition. In a preferred embodiment, the composition is removed by peeling. The vinyl-acrylic copolymer emulsions and vinyl acetate-ethylene emulsions will form a peelable film on a wide variety of surfaces. Thus, the protected surface can be a surface of an article of manufacture selected from the group consisting of a motor vehicle, motor vehicle components, bathroom and plumbing fixtures (e.g., sink, a bathtub, faucets, drains, chrome trim, etc.), glass (formed or in sheets), tools and machinery, marble (real or cultured), plexiglass and other plastics (formed, molded or sheet), laminates (e.g., Formica®, Wilson Art®) window and door assemblies, household appliances, aluminum components (e.g., tanks, wheels, trim), furniture (metal, plastic, or wood), plated or chromed parts (e.g., trim, moldings, bumpers), instrument panels, shelves, cabinets, and artwork (e.g. statues and sculptures).

In another embodiment, this invention provides for an article of manufacture having a surface coated with any of the above-described protective coating compositions, where the composition has dried to form a peelable protective coating. Coated articles of manufacture include, but are not limited to, any of the above-described articles of manufacture.

Finally, in another embodiment, this invention provides a method of transporting an article of manufacture. The method involves coating the article of manufacture with a protective coating composition comprising an emulsion selected from the group consisting of a vinyl-acrylic copolymer emulsion and a vinyl acetate-ethylene emulsion; transporting the article; and then removing the protective coating composition after transporting the article. In a preferred embodiment, the protective coating is removed by mechanical peeling. The protective coating can be applied by any convenient means, and is preferably applied by spraying. One one embodiment, the protective coating can additionally include a pigment. This method of transporting is suitable for virtually any article of manufacture as described herein, but is most preferably used for a motor vehicle (e.g., car, truck, motorcycle, construction vehicle, etc.).

All weight percentages provided herein refer to the dry weight of the active material. Commercial products may contain water addition to the active material. The coatings of this invention are compounded as aqueous solutions. Water may therefore comprise up to about 60 percent by weight of the composition before drying.

A further understanding of the nature and advantages of the invention described herein may be realized by reference to the remaining portions of the specification.

DETAILED DESCRIPTION

Figure 1:
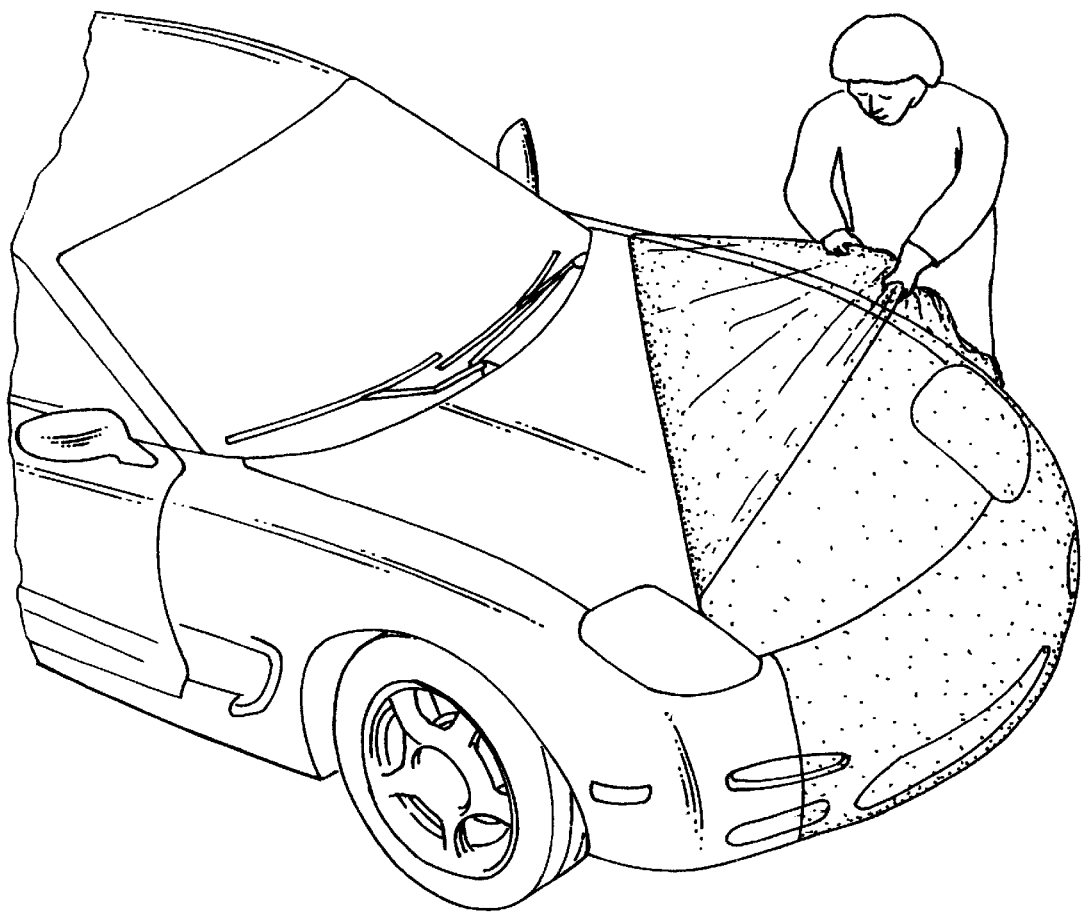
FIG. 1 illustrates removal of the protective coating from the surface of an automobile by peeling.

The present invention relates to the discovery that vinyl-acrylic copolymer emulsions typically used for interior and exterior paints, and vinyl acetate ethylene emulsions, typically used as adhesives, and compositions comprising such emulsions, can also be used as peelable protective coatings on a wide variety of surfaces. The emulsions, and compositions thereof, produce a film which adheres well to a surface to be protected, with few or no pinholes. Further, the coating film may be removed easily by simple mechanical peeling (i.e., by hand, or with the aid of a peeling tool).

It was a surprising discovery that the vinyl-acrylic copolymer emulsions and vinyl acetate ethylene emulsions can be used as removable (peelable) coatings. Vinyl-acrylic copolymer emulsions (e.g., Flexbond 325, or 380 from Air Products and Chemicals, Inc.) are typically used as principle components of interior and exterior paints (see, e.g. Flexbond 325 Technical Data Sheets available from Air Products, and Chemicals, Inc., Allentown, Pa., USA). As paint film formers, the vinylacrylic copolymer emulsions are designed to adhere strongly to the underlying surface and to resist subsequent removal. Easy peelability is not seen as a desirable property in a paint by those of skill in the art.

Similarly, vinyl-acetate ethylene emulsions (e.g., Air-Flex™ emulsions by Air Products, and Chemicals, Inc.) are typically used as adhesives. In particular, they are used as adhesives where good water resistance is desired. Again, prior to this invention one of skill would not view these adhesive compositions as suitable candidates for peelable protective coatings.

The vinyl-acrylic copolymer emulsions and vinyl acetate ethylene emulsions can be used as peelable coatings "straight out of the can" with essentially no further compounding. The emulsions adequately wet and adhere to the surfaces to which they are applied and yet can be easily peeled off without the use of releasing agents. Thus in one preferred embodiment, the coatings use the emulsion in the form provided by the manufacturer and thus require no compounding at all.

In other preferred embodiments, e.g., where pigments or other components are added to the basic emulsion, compounding requires only simple admixing the components (or aqueous solutions, dispersions, etc. thereof) at substantially atmospheric pressure so as to form a substantially homogeneous mixture. Thus an advantage of the present invention is the relatively simple formulation and therefore low labor costs in producing the coatings.

Preferred emulsions for use in the methods of this invention include vinylacrylic emulsions typically used in paints and vinyl acetate-ethylene emulsions typically used for adhesives. Particularly preferred emulsions are aqueous emulsions and are well known to hose of skill in the art. Preferred vinyl-acrylic copolymer emulsions include, but are not limited to Flexbond 149, 150, 153, 165, 185, 325, 825, or 845 (Air Products and Chemicals, Inc.), with Flexbond 325 and Flexbond 380 being most preferred. Preferred vinyl acetate-ethylene emulsions include Airflex emulsions (e.g., 320, 400, 400H, 440, 440H, 401, 405, 410, 420, 421, etc.) and the like, with Airflex 320 being most preferred.

While it was a discovery of this invention that the above-described emulsions provide suitable peelable coatings without additives, the coating compositions may contain a variety of other materials such as cosolvents and coalescers, antioxidants, antiozonates, UV stabilizers, colorants, defoamers, corrosion inhibitors, and the like. In one embodiment, the coating compositions can be compounded with a pigment. The pigment is largely used for coloration. However, without being bound to a particular theory, it is believed that the pigment may also contribute to longterm chemical stability of the composition through ultraviolet-blocking. In addition, the pigment may contribute to mechanical strength and stability of the composition (when dried as a film) by acting as a filler. Finally, it is believed that the pigment can help to decrease the water sensitivity of the composition.

The pigment is a finely divided material which contributes to optical and other properties of the coating. The pigment is insoluble in the coating medium (e.g. the aqueous dispersion) and is typically mechanically mixed with the coating and deposited when the coating dries. The physical properties of the pigment are not changed by incorporation in and deposition from the coating. Preferred pigments are inorganic "white" pigments although colored and certain organic pigments are also suitable. Inorganic white pigments suitable for this invention include, but are not limited to, titanium dioxide, white lead, zinc oxide, lithopone (a mixture of zinc sulfide and barium sulfate), zinc sulfide and antimony oxide. Titanium dioxide (e.g., TI-PURE® R-902, DuPont Chemicals, Wilmington, Del., USA) is particularly suitable for the present invention because high efficiency (unit opacity/weight). The pigment may be present at about 1 to about 20 percent, more preferably about 1 percent to about 5 percent, and most preferably about 2 percent, by weight, of the composition.

In some contexts, it is desirable to add releasing agents to facilitate the peelability of the film. Suitable releasing agents include, but are not limited to natural and synthetic waxes, wax emulsions (e.g., #110 available from Michelman, Cincinnati, Ohio, USA), lecithin, and surfactants with a hydrophile-lipophile balance (HLB) ranging from about 8 to about 10.

The coating composition can additionally include a thickener. Preferred thickeners show little or no water sensitivity. Suitable thickeners are well known to those of skill in the art and include, but are not limited to, Carbopol® EP1 Rohm & Haas 825, Montmorillonite, EZ-1, BFG, and the like. The thickener may be present at up to about 30%, by weight of the composition, but it is preferably present at up to about 5%, more preferably at up to about 3%, and most preferably at up to about 1%, by weight of the composition.

The coating composition can formulated with other film formers in addition to the vinyl-acrylic copolymer or ethylene vinyl acetate. Additional film formers suitable for use in this invention include, but are not limited to vinyl chloride copolymers (e.g. Carboset 1957, B. F. Goodrich, Cleveland, Ohio, USA), acrylic latex (e.g., 1324, B. F. Goodrich), acrylic copolymer emulsions (e.g., Hycar 2679, B. F. Goodrich), and styrene acrylic copolymers (e.g., Carboset 958, B. F. Goodrich). When used, the additional film formers can be present at up to about 90 percent, by weight of the coating, however, in a preferred embodiment, they are present at less than about 50 percent, more preferably less than about 20 percent and most preferably less than about 10 percent, by weight of the composition.

The vinyl-acrylic copolymer and vinyl acetate-ethylene emulsions, while applied as a liquid, will form a substantially continuous solid sheet when dried. Drying may be accomplished at room temperature (i.e. by air drying). However, dry time may be reduced using heat (e.g., using infra red heat lamps, hot air blowers, oven baking, or other heat sources).

As indicated above, it was a surprising discovery of this invention that vinyl-acrylic copolymer and vinyl acetate-ethylene emulsions can be used as protective (peel-off) coatings of that can be peeled a wide variety of surfaces coatings once cured. A "peelable" or "peel-off" coating is one that may be removed from the surface it coats simply by mechanical peeling. A peel-off coating preferably possesses sufficient flexibility, tensile and tear strength so that it does not fracture during peeling. The required flexibility, tensile and tear strength is a function of the strength of adhesion of the coating to the underlying surface. In a preferred embodiment, the adhesive ability of the film is sufficient to keep it completely bound to the underlying substrate throughout the period of protection and yet remain fully peelable at the time of removal. It is particularly preferred that the peel-off coating peel without trouble or without being torn in pieces. The coating when peeled should not remain partially unpeeled, leaving portions adhering to the substrate.

The vinyl-acrylic copolymer and vinyl acetate-ethylene emulsions used in the practice of the methods of his invention can be peeled off a wide variety of surfaces. These include, but are not limited to, metal, glass, plastic, painted wood, marble, laminate, plated surfaces, and the like.

In one embodiment, this invention provides a method of protecting surfaces wherein a substantially continuous film of a vinyl-acrylic copolymer or a vinyl acetate-ethylene emulsion is applied to the surface to be protected. The coating composition is applied by one of a variety of techniques including, but not limited to, application by brush, roller, spray, dipping, spreading (e.g. using a doctor bar), etc. Preferred techniques include roller application, brushing, and spraying of the surface with the coating composition. In some cases, additional water may be added for easier application, such as a 10% dilution. Thereafter, the coating composition may be applied with a pressure pot sprayer, preferably first in a thin mist and, thereafter, in a flow coat or thicker substantially continuous film. The coating composition is sprayed primarily on the surface to be protected, although overspray will not pose significant problems since any overspray may be readily removed with, for example, a wet towel or sponge or after curing by simply peeling the coating off the oversprayed surfaces. The resulting masking coating composition is from about 0.1 to about 30 mils thick, preferably about 0.5 to about 20 mils thick, more preferably from about 1 to about 10 mils thick, with a most preferred thickness of about 5 mils. Of course the thickness will vary depending on the requirements of the user. Thus, for example, where cost is a concern, thin coatings (~0.1 to 1 mil) are used. Conversely, where impact resistance is desired the coatings may have a thickness in excess of 30 mils.

In other preferred embodiments, the coating composition is applied in an aerosol form to a surface. In such embodiments, the composition is stored in a container pressurized with any of a number of propellants including such environmentally benign materials as dimethyl ether, nitrogen, or carbon dioxide. Alternatively, the composition can be stored in a pump-type spray can.

After application to a surface, the coating composition is permitted to dry. As explained above, the coating can be air dried or force dried by any of a number of methods well known to those of skill in the art.

One of skill in the art will recognize that the coatings of this invention may be utilized as part of a method of transporting vehicles which protects the exterior portions of the vehicle from scratches. Generally, any of the above-described surface protective coating compositions is applied to the surface to be protected, the vehicle is transported, and the protective coating is then removed from the surfaces by simple mechanical peeling as illustrated in FIG. 1. For example, cars to be loaded onto auto-carriers (either road or rail) are first cleaned of surface debris and dust and then coated with either of the surface protective coating compositions of the invention as described above. The cars are then transported to their destination where the surface protective coating is removed by peeling. Peeling may be accomplished by hand or with the aid of mechanical devices.

In addition, the coatings of the present invention may be applied to protect sensitive finishes on most any item exposed to deleterious environmental factors. For example, the composition of this invention can be used to coat glass and chrome products being transported or otherwise held or stored, building materials such as formica and bathroom fixtures, acrylic materials, boats being stored outdoors (particularly during winter), chrome tanks on tank trucks, and vehicles generally. Further, vehicle windshields and finishes can be protected against accumulations of insects and other bugs in environments where they are a problem. It has also been found that coatings prepared according to the present invention can be used to protect against graffiti. The paint from graffiti is simply peeled off with the protective coating.

A particularly useful application of the present invention is to protect wheels and tires of vehicles during normal use. In these embodiments, the coating composition is applied to the wheel and/or tire in the manner described above. Typically, a black layer of brake dust accumulates on wheels during normal operation. Because the wheels and tires are coated with the removable coating composition of this invention, the brake dust (and other accumulated dirt) is easily removed by peeling off the coating. The resulting clean wheel and tire can be re-coated with another layer of the coating composition.

Any of the coating compositions of this invention can also be used as a sacrificed layer to protect various items that are not necessarily associated with transportation. For example, various building fixtures found in bathrooms and most other rooms can be protected. Bathtubs, shower stalls, bathroom tiles and floors, etc. are all adversely affected by steam, mineral deposits from water, and soap scum. Much labor is expended by homeowners or maintenance personnel to remove bathroom deposits. The removable coating compositions of this invention are used to temporarily protect bathroom fixtures during normal use. When it is time to clean the bathroom, the coating is simply peeled from the underlying surfaces thereby removing the coating composition together with the accumulated dirt.

The coatings of this invention are tough, relatively thick, and provide a high degree of resistance to mechanical abrasion. They are therefore particularly suitable for protecting component parts during installation. Thus, for example, in bathroom components such as bathtubs, toilets, sinks and shower units are often damaged by contact with abrasives during installation. Workers often stand in or on these items and scratch their surfaces. Such damage is especially common when there is dirt or gravel in the tub and a worker standing in the tub, on top of the gravel grinds the gravel into the tub's surface with his feet. Additionally, because these items are typically left outside on the job site, the coatings' water resistant feature becomes very important.

Other fixtures that can be protected by this invention include banisters, electrical light switch plates, door knobs, windows, etc. Particularly preferred surfaces for coating include metals such as brass or chrome, ceramic, glass, and plastic laminates such as formica.

Similarly the coatings of this invention may protect component parts during assembly in an industrial setting. Thus, for example, component plastic bumpers may be coated to protect against scratching and other damage from the time they are produced, through the car assembly process, and until the car arrives at the dealership. The coatings may provide a rough easily gripped surface and therefore utilized to facilitate the gripping and manipulation of highly machined components without component scratching or other damage.

The coatings may also be used to maintain clean component parts until the time of use. Thus the coatings may be utilized to allow easy removal of accumulated layers of oil and grit, often present in factory environments, from metallic components awaiting assembly. The coating may be quickly peeled from the component just before use thereby removing the accumulated contaminating materials.

Because of their toughness, the coatings of this invention are also suitable for coating and protecting floor surfaces in highly trafficked areas. The compositions may be compounded with various particulate materials to enhance traction.

In addition, because of their stability to high temperatures for prolonged periods of time, the coatings of this invention are suitable for use as peelable paint-booth coatings.

Furniture may also be protected by the methods of this invention. In particular, lawn furniture and umbrellas can be protected by the coating compositions of this invention. In preferred embodiments, an ultra-violet radiation blocker is added to the coating composition to protect outdoor furniture and umbrellas from the effects of sunlight. Automobile upholstery can also be protected by the methods of this invention.

It should be noted that many of the protected surfaces tend to flex during normal use. For example, tires continually compress as they roll. In addition, pliable lawn furniture stretches when used. For these applications, the coating compositions of this invention must be sufficiently pliable to ensure that they do not crack during flexure.

It should be noted that the coating composition also protects surfaces from the deleterious effects of ozone, the ubiquitous pollutant formed in smog. It is known that ozone attacks rubbers and other elastomers, causing them to crack. By applying the coating compositions of this invention, cracking associated with ozone is reduced.

One of skill will appreciate that the protective coating need not be removed immediately from the article that it protects. To the contrary, the coating provides an effective protectant during periods of prolonged storage. Thus, in another embodiment, this invention provides for a composition comprising an article of manufacture having a surface coated with a protective coating composition (e.g. a vinylacrylic copolymer film or a vinyl acetate-ethylene film. The article of manufacture can be virtually any article of manufacture as described above.

EXAMPLES

The following examples are intended to illustrate the present invention and are not intended to limit the scope of the invention in any way.

Example 1

A coating consisting of Flexbond 325 (Air Products, and Chemicals, Inc., Allentown, Pa., USA) or Flexbond 380 (Air Products and Chemicals, Inc.) or Airflex 320 (Air Products and Chemicals, Inc.) was applied to a test surface by spraying. Test surfaces included ceramic tile, panels finished with an automotive paint finish, various types of plastic, glass, and aluminum to form a 5 mil coating. The coating was allowed to dry at room temperature for about 24 hours. The dried coating showed a high degree of resistance to water and other solvents. The coating was subsequently removed from the test surface by peeling it off in essentially one piece as illustrated in FIG. 1.

The advantages of the invention will now be apparent. The invention provides a method of protecting surfaces which is easy and cost-effective. Using the method of the invention, large surface areas or many surfaces may be protected from damage quickly, easily, cheaply, and safely. Although certain embodiments and examples have been used to describe the invention, it will be apparent to those skilled in the art that various changes may be made to those embodiments and/or examples without departing from the scope of the invention.

What is claimed is:

1. A method of protecting a surface, said method comprising:

applying to said surface a coating composition consisting essentially of an emulsion selected from the group consisting of a vinyl-acrylic copolymer and a vinyl acetate ethylene emulsion, wherein said coating composition is without a releasing agent; and drying said coating composition to form on said surface a substantially continuous water-resistant and water vapor resistant film; and removing said composition from said surface.

2. The method of claim 1, wherein said protective coating is applied as an aqueous emulsion.

3. The method of claim 1, wherein said emulsion is selected from the group consisting of an aqueous dispersion of a vinyl acetate-acrylic copolymer (FlexBond 325). and a vinyl Acetate-ethylene emulsions (Airflex 320).

4. A method of protecting a surface, said method comprising:
   applying to said surface a coating composition consisting essentially of a pigment and an emulsion selected from the group consisting of a vinyl-acrylic copolymer emulsion;
   and a vinyl acetate-ethylene emulsion, wherein said coating composition is without a releasing agent; and drying said coating composition to form on said surface a substantially continuous water-resistant and water vapor resistant film.

5. The method of claim 1, wherein said applying is by a means selected from the group consisting of a sprayer, a brush, a roller, and a doctor bar.

6. The method of claim 1, wherein said applying comprises air drying said composition at room temperature.

7. The method of claim 1, wherein said removing comprises peeling said composition from said surface.

8. The method of claim 1, wherein said surface is a surface of an article of manufacture selected from the group consisting of a motor vehicle, a motor vehicle component, a bathroom fixture, a plumbing fixture, a tool, a machine, a laminated countertop, a table top, a window assembly, a door assembly, a stove, a refrigerator, a microwave oven, an aluminum tank, a wheel, furniture, a plated or chromed part, a bumper, an instrument panel, a shelf, and a cabinet.

9. As an article of manufacture a surface coated with a composition consisting essentially of an aqueous emulsion selected from the group consisting of a vinyl-acrylic copolymer emulsion and a vinyl acetate-ethylene emulsion, wherein said coating composition is without a releasing agent and wherein said emulsion has dried to form a peelable water-resistant and water-vapor-resistant protective coating.

10. The article of manufacture of claim 9, wherein said emulsion is selected from the group consisting of a motor vehicle, a motor vehicle component, a bathroom fixture, a plumbing fixture, a tool, a machine, a laminated countertop, a table top, a window assembly, a door assembly, a stove, a refrigerator, a microwave oven, an aluminum tank, a wheel, furniture, a plated or chromed part, a bumper, an instrument panel, a shelf, and a cabinet.

11. The article of manufacture of claim 9, wherein said emulsion is selected from the group consisting of an aqueous dispersion of a vinyl acetate-acrylic copolymer (FlexBond 325), and a vinyl Acetate-ethylene emulsions (Airflex 320).

12. As an article of manufacture a surface coated with a composition consisting essentially of a pigment and an emulsion selected from the group consisting of a vinyl-acrylic copolymer emulsion and a vinyl acetate-ethylene emulsion, wherein said coating composition is without a releasing agent and wherein said emulsion has dried to form a peelable water-resistant and water-vapor-resistant protective coating.

13. The article of manufacture of claim 9, wherein said article of manufacture is selected from the group consisting of a motor vehicle, a motor vehicle component, a bathroom fixture, a plumbing fixture, a tool, a machine, a laminated countertop, a table top, a window assembly, a door assembly, a stove, a refrigerator, a microwave oven, an aluminum tank, a wheel, furniture, a plated or chromed part, a bumper, an instrument panel, a shelf, and a cabinet.

14. A method of transporting an article of manufacture, said method comprising the steps of:
   i) coating said article of manufacture with a protective coating composition consisting essentially of an emulsion selected from the group consisting of a vinyl-acrylic copolymer emulsion and a vinyl acetate-ethylene emulsion, wherein said coating composition is without a releasing agent and said coating composition forms a water resistant and water vapor-resistant film;
   ii) transporting said article; and
   iii) removing said protective coating composition after transporting said article.

15. The method of claim 14, wherein said removing is by mechanical peeling.

16. The method of claim 14, wherein said coating is by spraying.

17. A method of transporting an article of manufacture, said method comprising the steps of:
   i) coating said article of manufacture with a protective coating composition consisting essentially of a pigment and an emulsion selected from the group consisting of a vinyl-acrylic copolymer emulsion and a vinyl acetate-ethylene emulsion, wherein said coating composition is without a releasing agent and said coating composition forms a water resistant and water vapor-resistant film;
   ii) transporting said article; and
   iii) removing said protective coating composition after transporting said article.

18. The method of claim 14, wherein said article of manufacture is selected from the group consisting of a motor vehicle, a motor vehicle component, a bathroom fixture, a plumbing fixture, a tool, a machine, a laminated countertop, a table top, a window assembly, a door assembly, a stove, a refrigerator, a microwave oven, an aluminum tank, a wheel, furniture, a plated or chromed part, a bumper, an instrument panel, a shelf, and a cabinet.

19. The method of claim 18, wherein said article of manufacture is a motor vehicle.

\* \* \* \* \*